US011003362B2

(12) United States Patent
Apte et al.

(10) Patent No.: US 11,003,362 B2
(45) Date of Patent: *May 11, 2021

(54) DISASTER RECOVERY PRACTICE MODE FOR APPLICATION VIRTUALIZATION INFRASTRUCTURE

(71) Applicant: International Business Machines Corporation, Armonk, NY (US)

(72) Inventors: Ajay A. Apte, Austin, TX (US); Hugh E. Hockett, Raleigh, NC (US); Scott C. Moonen, Fuquay Varina, NC (US); James P. Robbins, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 13 days.

This patent is subject to a terminal disclaimer.

(21) Appl. No.: 16/110,021

(22) Filed: Aug. 23, 2018

(65) Prior Publication Data

US 2018/0365120 A1 Dec. 20, 2018

Related U.S. Application Data (63) Continuation of application No. 15/281,659, filed on Sep. 30, 2016, now Pat. No. 10,089,205.

(51) Int. Cl.
*G06F 11/00* (2006.01)
*G06F 3/06* (2006.01)
(Continued)

(52) U.S. Cl.
CPC ............ *G06F 3/0619* (2013.01); *G06F 3/065* (2013.01); *G06F 3/0644* (2013.01);
(Continued)

(58) Field of Classification Search
CPC ............ G06F 11/1662; G06F 11/2092; G06F 11/2094; G06F 11/1658; G06F 11/2053;
(Continued)

(56) References Cited

U.S. PATENT DOCUMENTS 8,020,037 B1 * 9/2011 Schwartz ............ G06F 11/2094
714/6.3
8,788,877 B2 7/2014 Blea et al.
(Continued)

OTHER PUBLICATIONS

Bresnahan, John, Tim Freeman, David LaBissoniere, and Kate Keahey. "Managing appliance launches in infrastructure clouds." In Proceedings of the 2011 TeraGrid Conference: Extreme Digital Discovery, p. 12. ACM, 2011. (Year: 2011).*

(Continued)

*Primary Examiner* — Anthony J Amoroso
(74) *Attorney, Agent, or Firm* — Brown & Michaels, PC; Christopher Pignato (57) ABSTRACT

Automatically managing an entire life-cycle of a practice failover. The system uses a virtualization management system that hosts one or more business applications which has capability and authority to manage both the application hosting infrastructure as well as the storage infrastructure that is used by the applications in a disaster recovery configuration. The set of applications is replicated along with an application platform together with the applications.

8 Claims, 8 Drawing Sheets

(51) Int. Cl.
  *G06F 11/20* (2006.01)
  *G06F 11/16* (2006.01)
(52) U.S. Cl.
  CPC ........ *G06F 3/0673* (2013.01); *G06F 11/1662* (2013.01); *G06F 11/2092* (2013.01); *G06F 11/2094* (2013.01); *G06F 2201/815* (2013.01)
(58) Field of Classification Search
  CPC ............. G06F 11/2056; G06F 11/2089; G06F 11/2273; G06F 11/263; G06F 11/26; G06F 3/0619; G06F 3/0644; G06F 3/065; G06F 3/0673; G06F 3/0614; G06F 3/0646; G06F 3/0653; G06F 3/067; G06F 3/0671; G06F 3/0683; G06F 2201/815
  See application file for complete search history.

(56) References Cited

U.S. PATENT DOCUMENTS

| | | | |
|---|---|---|---|
| 9,274,903 B1 * | 3/2016 | Garlapati | G06F 11/1658 |
| 10,326,655 B1 * | 6/2019 | Sait | H04L 67/1095 |
| 2011/0231698 A1 | 9/2011 | Zlati et al. | |
| 2012/0254123 A1 | 10/2012 | Ferguson et al. | |
| 2016/0154709 A1 * | 6/2016 | Mitkar | G06F 11/1466 707/649 |

OTHER PUBLICATIONS

Acharya, Amit P., Tom Bal, Kyle Brown, Srinivas Cheemalapati, Rodrigo Costa, Venkata Gadepalli, Rajeev Gandhi et al. IBM PureApplication System Best Practices. IBM Redbooks, 2014. (Year: 2014).*

"Testing a Recovery Plan", retrieved from https://pubs.vmware.com/srm-51/index.jsp#com.vmware.srm.admin.doc/GUID-1BEBD621-42B1-41D7-8FB7-AF259B60FC40.html; at least as early as Mar. 2015.

"Method and System for Using a Disaster Recovery Orchestrator to Automate Disaster Recovery in Virtual Environments", An IP.com Prior Art Database Technical Disclosure; Dec. 2014.

Bresnahan et al. "Managing Appliance Launches in Infrastructure Clouds", Teragrid Conference; Jul. 2011.

* cited by examiner

DISASTER RECOVERY PRACTICE MODE FOR APPLICATION VIRTUALIZATION INFRASTRUCTURE

BACKGROUND

The present invention relates to disaster recovery, and more specifically to replication of data for disaster recovery.

Business application administrators wish to provide continuity of business for their applications in case of a disaster. There are a variety of techniques for doing this, including building highly available applications that are simultaneously active at multiple physical locations, and building disaster recovery solutions that allow an application and its data to be replicated from one physical location to another and recovered (or failed over) quickly on the secondary location in case of a disaster.

As part of a disaster recovery solution, it is important to regularly test application failover in order to be confident of the solution, and in order to remain confident of the solution as changes are made to the application and the application infrastructure. Many businesses or industries stipulate regular business continuity tests as a self-governing requirement, and in some industries this is even a regulatory requirement. We will call this test a "practice failover".

In the state of the art, it is possible to practice a failover without severing the replication of application data, by making a point-in-time copy of the data at the secondary location, and recovering the application using that copy of the data. This ensures that there is never a point in time during the practice failover when the primary location does not have a complete and full backup of all of its current data.

There are several important considerations to note with practice failover:

First, the business must plan for up to double the amount of data usage at the secondary location in order to allow the data to be copied (techniques such as thin-copy methods or transient re-do logs can be used to reduce this overhead).

Second, if the replicated application is reinstated using the same network naming and addressing as at the primary location, care must be taken to ensure the practice failover is performed in a segregated network environment that does not compromise the application that is still running at the primary location. (This segregated network environment also helps to verify that the secondary location is not dependent on infrastructure or services from the primary location in any way.)

Finally, it is important to carefully coordinate the copying, mapping, and attachment of all replicated storage at the secondary location, without impacting the original copy of the storage that is still being replicated during the practice event.

When using software-based storage replication such as VMware from Dell's Site Recovery Manager (SRM), it is possible in the state of the art to perform a coordinated practice failover for an entire application or set of applications while preserving the original replica. However, this is not possible as a single coordinated action when using Storage Area Network (SAN)-based storage replication.

Using SAN-based storage replication requires the application administrator to explicitly coordinate all activities, including (1) the identification and copying of multiple storage volumes, (2) the mapping and attachment of these storage volumes to the application infrastructure, (3) the registration and initiation of the applications in the application infrastructure. This is a very complex and error-prone activity.

SAN-based storage replication is much preferred in the industry, as it is more efficient and also allows for better recovery point objective (RPO) characteristics than software-based replication.

U.S. Pat. No. 8,788,877 addresses the case of what happens when a disaster occurs in an environment that is replicating storage. Whether the disaster involves the loss of the original storage, or the replicated copy, the disaster leaves the system with only a single copy of data.

US Patent Application Publication 2011/0231698 addresses the implementation of software-based methods for storage replication, and documents particular ways of optimizing this replication.

US Patent Application Publication 2012/0254123 addresses the implementation of point-in-time backup or snapshot copies that are made of a virtual filesystem that is backed by one or more physical filesystems or disks. It addresses the need to keep track of how the constitution of the virtual filesystem from the physical disks may change over time, so that older snapshots may relate to a different configuration than the present time.

SUMMARY

According to one embodiment of the present invention, a method is disclosed. The method comprising: receiving storage volume information including information indicative of an identity of a set of storage volume(s) being used by a set of application(s); newly creating a new storage volume to be included in the set of storage volume(s); configuring the new storage volume for replication from a primary location to a secondary location; and responsive to the configuration of the new storage volume, conducting a practice event including: snapshotting the new storage volume, and starting the applications (cpu, memory and networking).

According to another embodiment of the present invention, a method is disclosed. The method comprising: replication of platform as a service (PaaS) in a practice mode by conducting a practice event including: snapshotting the relevant data set(s), and starting the applications (cpu, memory and networking).

According to another embodiment of the present invention, a computer program product is disclosed. The computer program product comprising a computer comprising at least one processor, one or more memories, one or more computer readable storage media, the computer program product comprising a computer readable storage medium having program instructions embodied therewith. The program instructions executable by the computer to perform a method comprising: replication of platform as a service (PaaS) in a practice mode by conducting a practice event including: snapshotting the relevant data set(s), and starting the applications (cpu, memory and networking).

According to another embodiment of the present invention, a computer system is disclosed. The computer system comprising: a computer comprising at least one processor, one or more memories, one or more computer readable storage media having program instructions executable by the computer to perform the program instructions. The program instructions comprising: replication of platform as a service (PaaS) in a practice mode by conducting a practice event including: snapshotting the relevant data set(s), and starting the applications (cpu, memory and networking).

According to another embodiment of the present invention, a computer program product is disclosed. The computer program product comprising a computer comprising at least one processor, one or more memories, one or more computer readable storage media, the computer program product comprising a computer readable storage medium having program instructions embodied therewith. The program instructions executable by the computer to perform a method comprising: receiving, by the computer, storage volume information including information indicative of an identity of a set of storage volume(s) being used by a set of application(s); newly creating, by the computer, a new storage volume to be included in the set of storage volume(s); configuring, by the computer, the new storage volume for replication from a primary location to a secondary location; and responsive to the configuration of the new storage volume, conducting, by the computer, a practice event including: snapshotting the new storage volume, and starting the applications (cpu, memory and networking).

According to another embodiment of the present invention, a computer system is disclosed. The computer system comprising: a computer comprising at least one processor, one or more memories, one or more computer readable storage media having program instructions executable by the computer to perform the program instructions. The program instructions comprising: receiving, by the computer, storage volume information including information indicative of an identity of a set of storage volume(s) being used by a set of application(s); newly creating, by the computer, a new storage volume to be included in the set of storage volume(s); configuring, by the computer, the new storage volume for replication from a primary location to a secondary location; and responsive to the configuration of the new storage volume, conducting, by the computer, a practice event including: snapshotting the new storage volume, and starting the applications (cpu, memory and networking).

DETAILED DESCRIPTION

Figure 1:
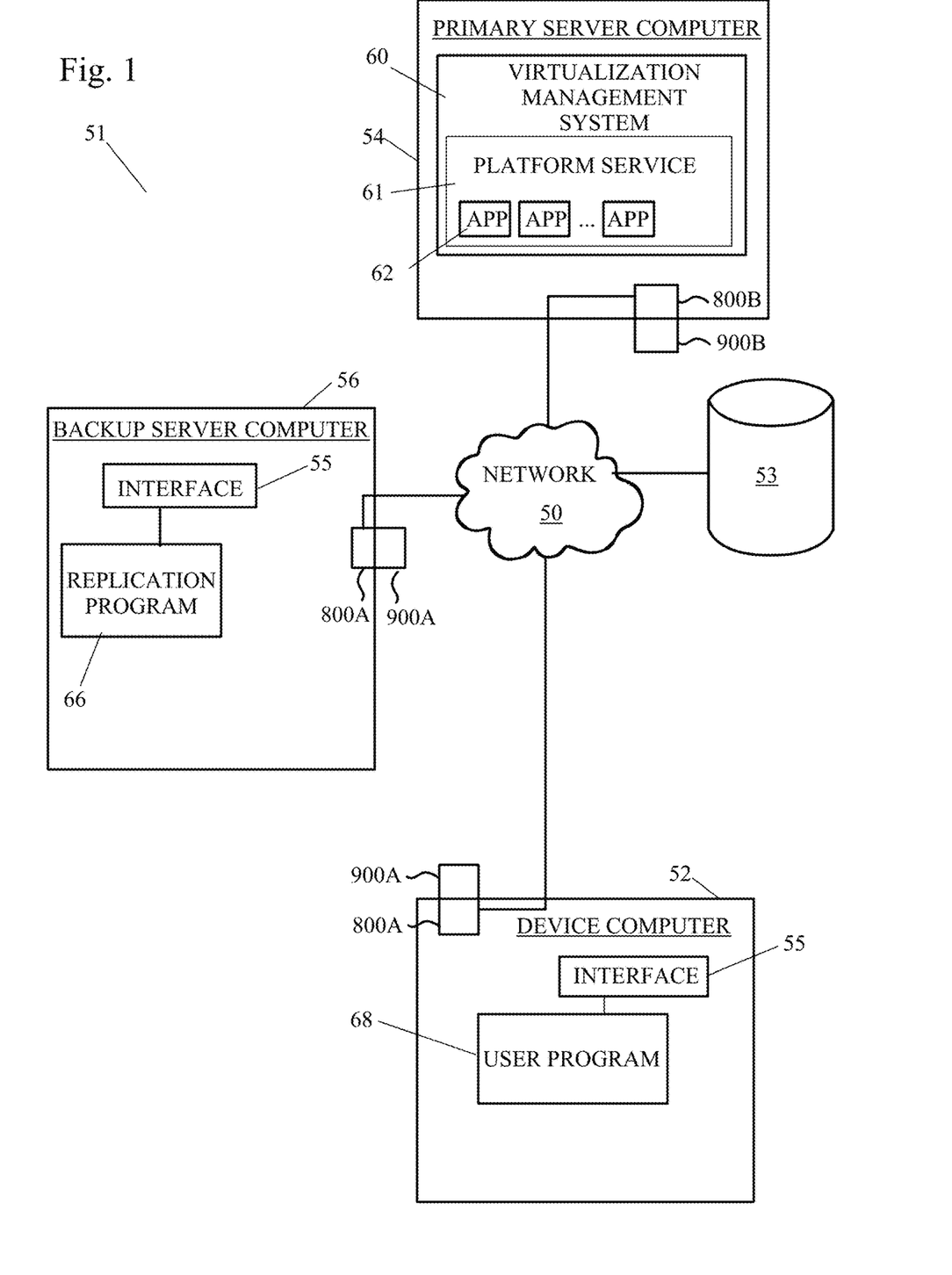
FIG. 1 shows an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computer 52, a repository 53, and server computers 54 and 56 connect to network 50. In other exemplary embodiments, network data processing system 51 may include additional client or device computers, storage devices or repositories, server computers, and other devices not shown.

The device computer 52 may contain an interface 55, which may accept commands and data entry from a user. The commands may be regarding temporary dynamic anchor points within a document or multiple documents. The interface can be, for example, a command line interface, a graphical user interface (GUI), a natural user interface (NUI) or a touch user interface (TUI). The device computer 52 preferably includes user program 68. The device computer 52 includes a set of internal components 800*a* and a set of external components 900*a*, further illustrated in FIG. 9.

Primary server computer 54 and backup server computer 56 include a set of internal components 800*b* and a set of external components 900*b* illustrated in FIG. 1. In the depicted example, primary server computer 54 may provides information, such as boot files, operating system images, and applications to the device computer 52. Server computer 54 can compute the information locally or extract the information from other computers on network 50.

Figure 9:
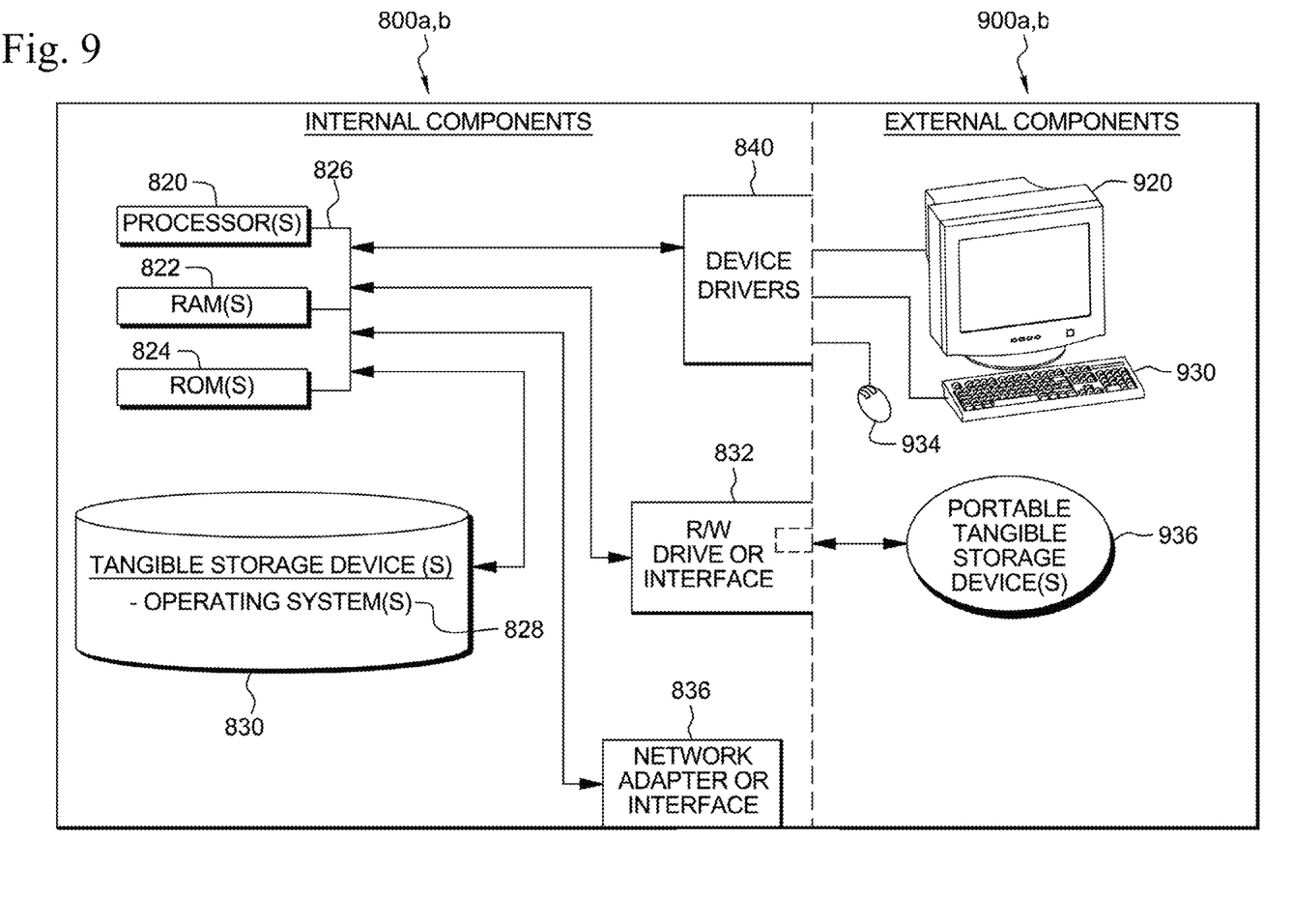
FIG. 9 shows internal and external components of a client computer and a server computer in which illustrative embodiments may be implemented.

Program code and programs such as replication program 66 may be stored on at least one of one or more computer-readable tangible storage devices 830 shown in FIG. 9, on at least one of one or more portable computer-readable tangible storage devices 936 as shown in FIG. 9, or on storage unit 53 connected to network 50, or may be downloaded to a device computer 52 or server computers 54 or 56, for use. For example, program code and programs such as replication program 66 may be stored on at least one of one or more storage devices 830 on primary server computer 54 and downloaded to device computer 52 over network 50 for use. Alternatively, primary server computer 54 can be a web server, and the program code, and programs such as replication program 66 may be stored on at least one of the one or more storage devices 830 on primary server computer 54 and accessed device computer 52. In other exemplary embodiments, the program code, and programs such as replication program 66 may be stored on at least one of one or more computer-readable storage devices 830 on device computer 52 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

FIG. 9 illustrates internal and external components of a device computer 52, primary server computer 54 and backup server computer 56, in which illustrative embodiments may be implemented. In FIG. 9, a device computer 52, primary server computer 54 and backup server computer 56, include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and replication program 66 are stored on one or more of the computer-readable tangible storage devices 830 for execution by one or more of the processors 820 via one or more of the RAMs 822 (which typically include cache memory). In the embodiment illustrated in FIG. 9, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Replication program 66 and user program 68 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Replication program 66 and user program 68 can be downloaded to the device computer 52 and backup server computer 56 from an external computer via a network (for example, the Internet, a local area network or other, wide area network) and network adapter or interface 836. From the network adapter or interface 836, replication program 66 and user program 68 are loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Replication program 66 and user program 68 can be written in various programming languages including low-level, high-level, object-oriented or non object-oriented languages. Alternatively, the functions of replication program 66 and user program 68 can be implemented in whole or in part by computer circuits and other hardware (not shown).

The present disclosure shows a system and method for automatically managing the entire life-cycle of a practice failover. It allows for the significant cost savings and efficiency of using SAN-based storage replication, while also allowing for the significant efficiency and risk reduction of the automated management of potentially hundreds or thousands of storage volumes. The system uses a virtualization management system 60 (Infrastructure as a Service or "IaaS"), or a possible platform service 61 built on top of that system (Platform as a Service or "PaaS") that hosts one or more business applications 62, to have the capability and authority to manage both the application hosting infrastructure as well as the storage infrastructure that are used by the applications in a disaster recovery configuration. Examples of an application platform include IBM® Workload Deployer or Cloud Foundry® from Cloudfoundry.org Foundation, Inc. The virtual management system 60 may be present on the primary server computer 54.

In an embodiment of the invention, not only a set of applications is replicated, but also an application platform together with the applications (together referred to as a "Workload Environment").

Replication of the PaaS was delivered in a prior art version of the IBM® PureApplication® product. The present disclosure goes beyond the prior art by providing (1) the replication of a PaaS in practice mode; and (2) the ability of the PaaS to integrate into the practice event by providing additional intelligence, such as properly coordinating an ordered startup of applications together with all of their dependent applications.

The present system differs from prior art SRM in that it applies to application storage 53 that is hosted on a storage area network (SAN) 50 and is replicated using hardware-based replication. In this case, the use of temporary journaling is not possible, and instead the practice must be coordinated through the use of careful copying of the storage volumes.

In another embodiment, the system replicates not only applications, but also an application platform. An application platform may include middleware and other services as well as the application itself. The present invention is applicable to service providers as well as businesses that offer a "platform as a service" (PaaS).

The following discussion shows what is possible with replicating an entire workload environment, including applications and PaaS. This discussion also shows replicating multiple tenants simultaneously, instead of replicating a single workload environment.

Method of Executing a Practice Failover

Figure 2:
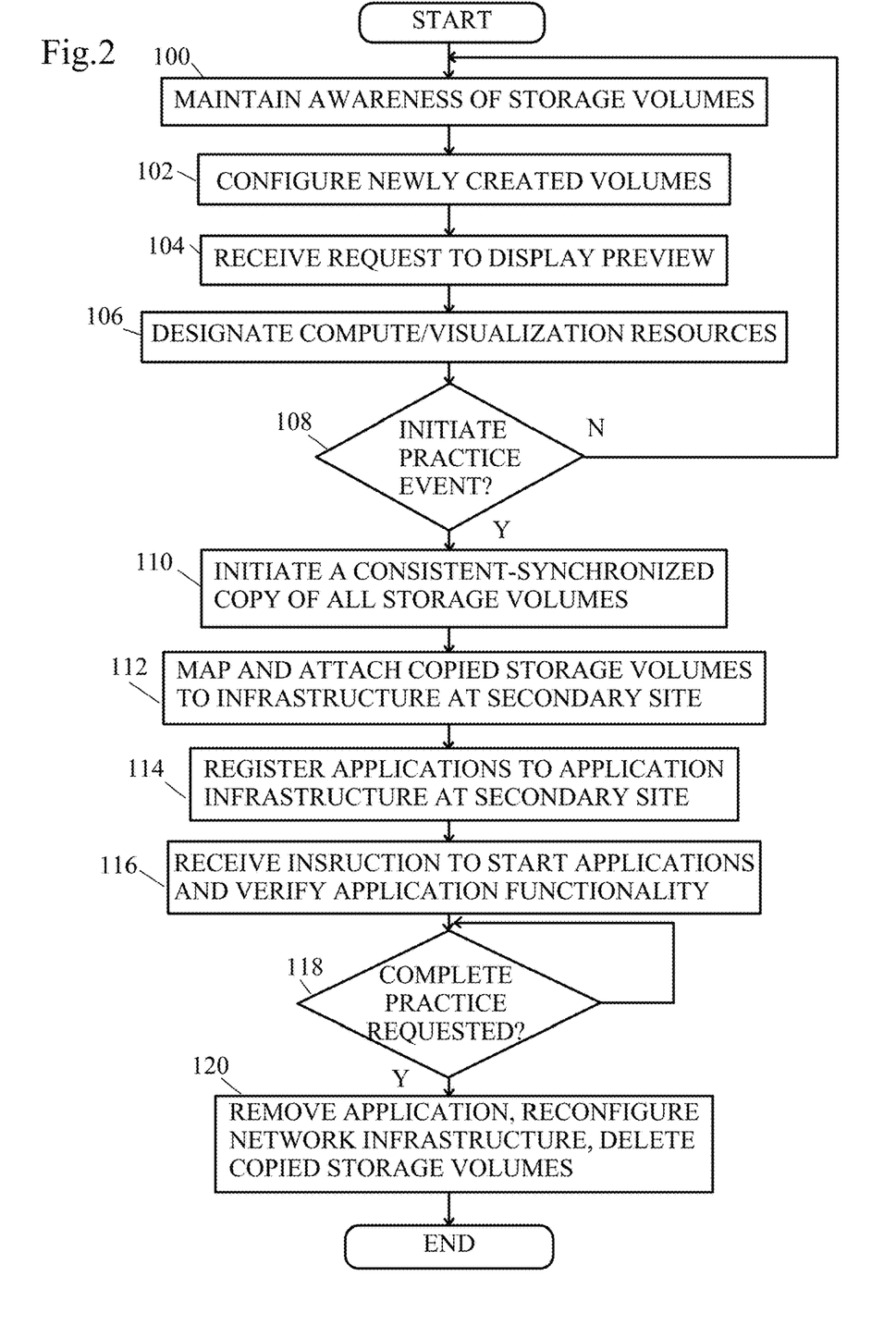
FIG. 2 shows a flowchart of a method of executing a practice failover.

As shown in the flowchart of FIG. 2, the system performs the following procedures to execute a practice failover:

The system maintains continuous awareness of storage volumes in use by the application or applications (Step 100).

The system configures newly created storage volumes for replication from the primary location to the secondary location (Step 102). In an example embodiment, the storage devices in use are V7000 storage devices (e.g. IBM® Storwise V7000) that are configured in a replication partnership. The infrastructure monitors for the creation of new disks in the V7000 storage devices and creates remote copy relationships for all such disks to replicate from the primary location to the secondary location.

The administrator may optionally request the system to display a preview of the practice event, showing the amount of resources the practice snapshot will take after the snapshot (storage) and after starting the applications (computer processing unit (CPU), memory and networking) (Step 104).

The administrator may also have the system designate compute/virtualization hypervisor hosts resources ahead of time for use during a disaster or a practice event. The compute resources may be waiting on standby with no applications or currently in use with other applications, in which case those applications would be shut down for the higher priority practice/disaster recovery (DR) event (Step 106).

The practice event is initiated, for example by the system receiving an instruction from an administrator (Step 108). If the practice event is not initiated the method continues to step 100.

The system initiates a consistent-synchronized copy of all of the storage volumes in use by the application or applications (Step 110). In an example embodiment, the storage devices in use are V7000 storage devices. All of the storage volumes are mapped to a "flash copy group" and initiates a consistent "flashcopy" of the entire set of volumes is initiated. This creates an instantaneous thin copy of all of the replicated volumes at the secondary location.

When the copy is ready for use (this may be nearly immediate in the case of a thin copy), the system maps and attaches all copied storage volumes to the application infrastructure at the secondary location (Step 112). In an example embodiment, the storage devices in use are V7000 storage devices. In this step, the system creates a "host mapping" for each of the copied storage volumes allowing all virtualization hypervisor hosts to attach the storage volumes. In an example embodiment, the virtualization system is VMware vCenter combined with ESXi hypervisors. The system can discover the storage volumes through vCenter and mount them to the ESXi hypervisors. This requires the storage volumes to be resignatured so they appear to contain actual virtual machines and not snapshots.

The system registers all applications to the application infrastructure at the secondary location (Step 114). The system may automatically segregate the network for testing purposes. In an example embodiment, the virtualization system is VMware vCenter combined with ESXi hypervisors. The system adds all of the virtual machines to the ESXi inventory and defines their VLAN port group assignments. It may assign the virtual machines to a special set of port groups that are isolated from the datacenter network and are used only for practice purposes.

The system receives instructions from the administrator to instruct the system to start all applications in the appropriate order and perform automated or manual verification of the application functionality (Step 116).

The application administrator can request completion of the practice at any time (Step 118). This may be midway through the practice, for example in case an actual disaster has occurred and the practice failover must be superseded by an actual failover. Step 118 repeats until a complete practice is requested.

When the request to complete the practice is received, (step 120) the system removes the application or applications, reconfigures the network infrastructure as needed, and deletes all storage volumes that were copied for the practice event. In an example embodiment, the virtualization system is VMware vCenter combined with ESXi hypervisors, and the system immediately terminates all virtual machines and unmounts all storage volumes from the hypervisors. In another example embodiment, the storage devices in use are all V7000 storage devices, and the system immediately removes all host mappings assigning the storage volumes to the hypervisors, and immediately stops the flash copy mapping, and stops and removes the flash copy mapping and flash copy group and the method ends.

Figure 3:
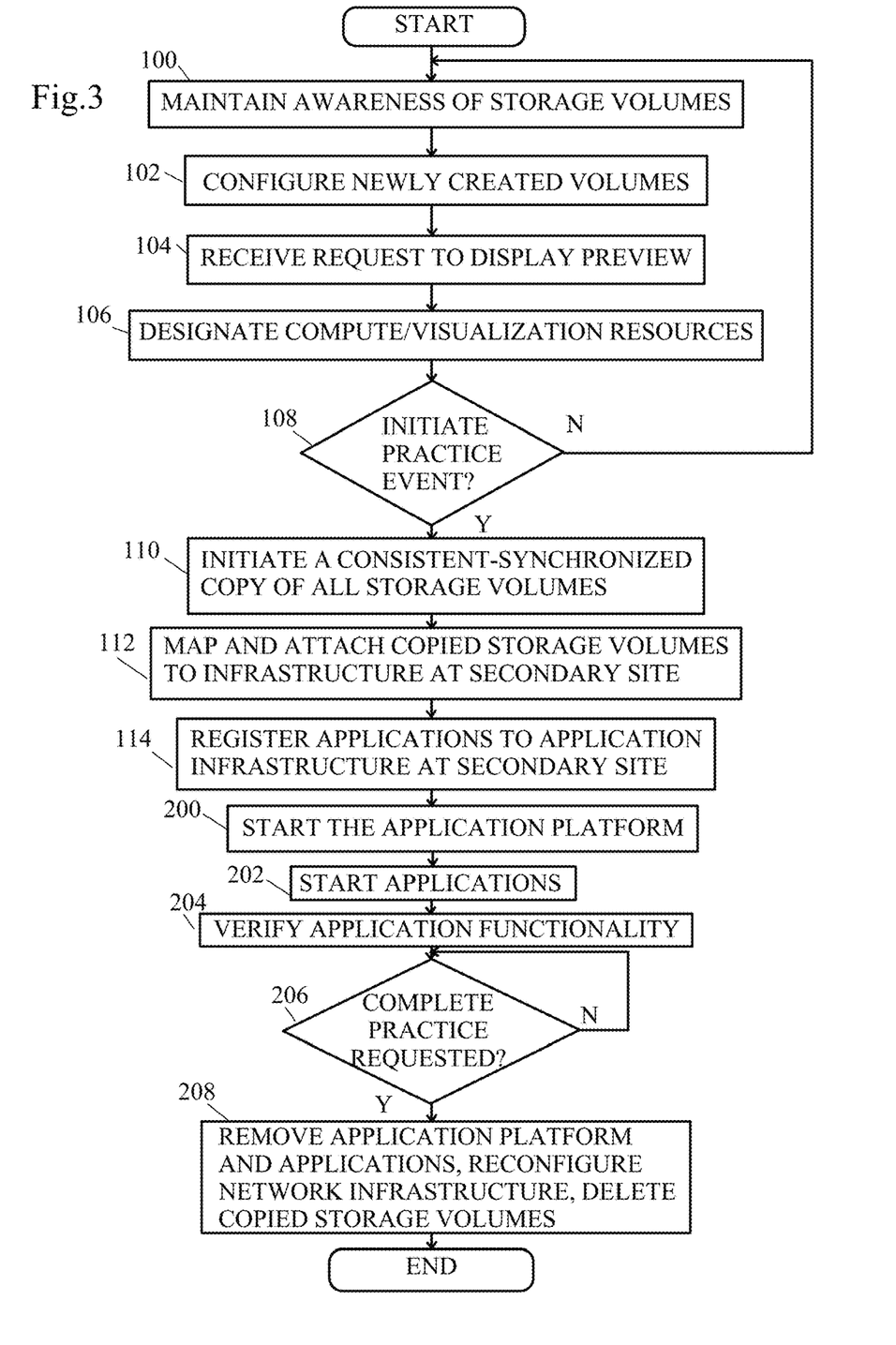
FIG. 3 shows a flowchart of another embodiment of a method of executing a practice failover.

FIG. 3 shows another embodiment of the method. Note that in the discussion of this figure below, steps 100-114 are summarized briefly, as these steps are the same as in FIG. 2. See above for a detailed discussion of these steps.

In the method of FIG. 3, the following steps are performed:

Maintain continuous awareness of storage volumes in use (Step 100).

Configure newly created storage volumes (Step 102).

The administrator may optionally request the system to display a preview of the practice event (Step 104).

The administrator may also have the system designate compute/virtualization hypervisor hosts resources (Step 106).

If a practice event is not initiated (Step 108), the method returns to step 100.

When the practice event is initiated (step 108), a consistent-synchronized copy of all of the storage volumes in use is initiated (Step 110).

Map and attach all copied storage volumes to the application infrastructure at the secondary location (Step 112).

Register all applications to the application infrastructure at the secondary location (Step 114).

The system then starts the application platform (PaaS) (Step 200). In an example embodiment, the application platform is IBM® PureApplication® Software. The present invention starts the PureApplication® Software virtual machine and causes it to connect to the virtualization infrastructure at the secondary location.

The platform starts applications on behalf of the administrators, preserving configured characteristics such as priority, startup sequence, interconnectivity, isolation, etc. (Step 202). In an example embodiment, the application platform is IBM® PureApplication® Software. All shared services and database instances are started before starting any application instances. Additionally, all instances are started in order of their initial deployment priority from High to Medium to Low.

The application functionality is automatically verified (Step 204). The application functionality may manually verified by the application administrator.

The application administrator can request completion of the practice at any time (Step 206). This may be midway through the practice, for example in case an actual disaster has occurred and the practice failover must be superseded by an actual failover.

When the request to complete the practice is received, (step 208) the system removes the application platform, in addition to the application or applications, reconfigures the network infrastructure as needed, and deletes all storage volumes that were copied for the practice event. In an example embodiment, the application platform is IBM® PureApplication® Software. The application terminates the PureApplication® Software virtual machine. In an example embodiment, the virtualization system is VMware® vCenter combined with ESXi hypervisors. The system immediately terminates all virtual machines and unmounts all storage volumes from the hypervisors. In an example embodiment, the storage devices in use are all V7000 storage devices. The system immediately removes all host mappings assigning the storage volumes to the hypervisors, and immediately stops the flash copy mapping, and stops and removes the flash copy mapping and flash copy group.

Disaster Recovery (DR)—Scenarios

Figure 4A:
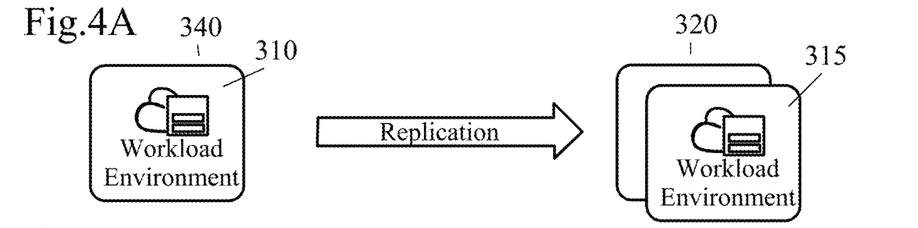
FIGS. 4A-4C show three disaster recovery scenarios.
Figure 4B:
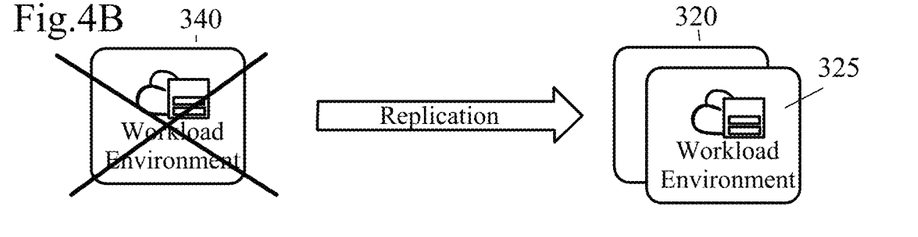
Figure 4C:
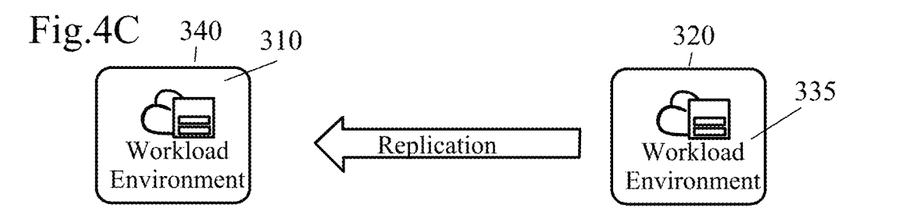

Referring to FIGS. 4A to 4C, three scenarios can be seen:

FIG. 4A shows a Practice DR Scenario. In this scenario, the primary tenant 310 continues to run in production on the primary system 340 with replication to the backup system 320. A copy 315 of the tenant 310 on the backup system 320 is started in an isolated environment for testing purposes.

FIG. 4B shows a DR (Unplanned Failover) scenario. In this scenario, the primary system 340 is lost. The tenant 325 is started on the backup system 320.

FIG. 4C: shows a Move (Planned Failover) scenario. In this scenario, the primary system 340 tenant 310 is stopped during a maintenance window. Replication is reversed and the tenant 335 is started on the backup system 320 while maintaining replication back to the original primary system 340 for DR.

Disaster Recovery (DR)—Setup

Figure 5:
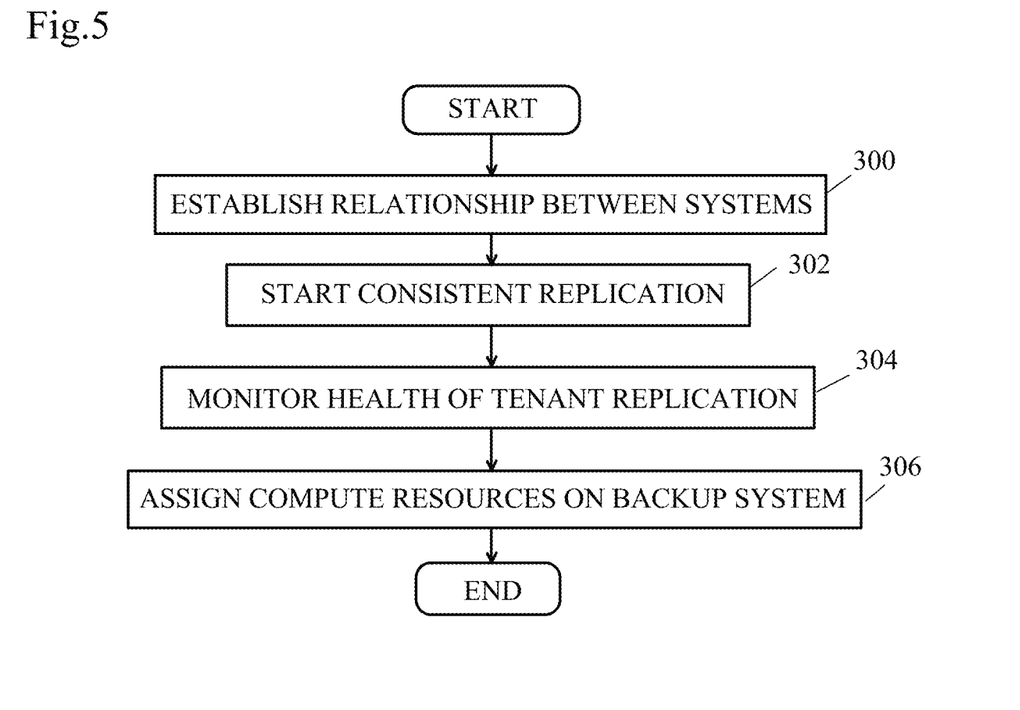
FIG. 5 shows a flowchart of a method of setting up Disaster Recovery

FIG. 5 shows a flowchart of a method of setup for Disaster recovery, which performs the following steps:

A trusted relationship is established between one or more systems for replicating tenants (Step 300). This can be done by using current block storage replication relationships, or, alternatively, by using a PureApplication® multi-rack domain relationship.

Consistent replication of a running tenant environment from one system to another is started (Step 302).

The health of tenant replication is monitored from primary to the backup from either side (Step 304). In this step, a User Interface (UI) page can show status of replication. Events can be raised if there are replication issues (e.g. SNMP events).

Compute resources are assigned on backup system to a tenant ahead of time or at time of DR (or practice DR) (Step 306).

Disaster Recovery—Practice DR Scenario

Figure 6:
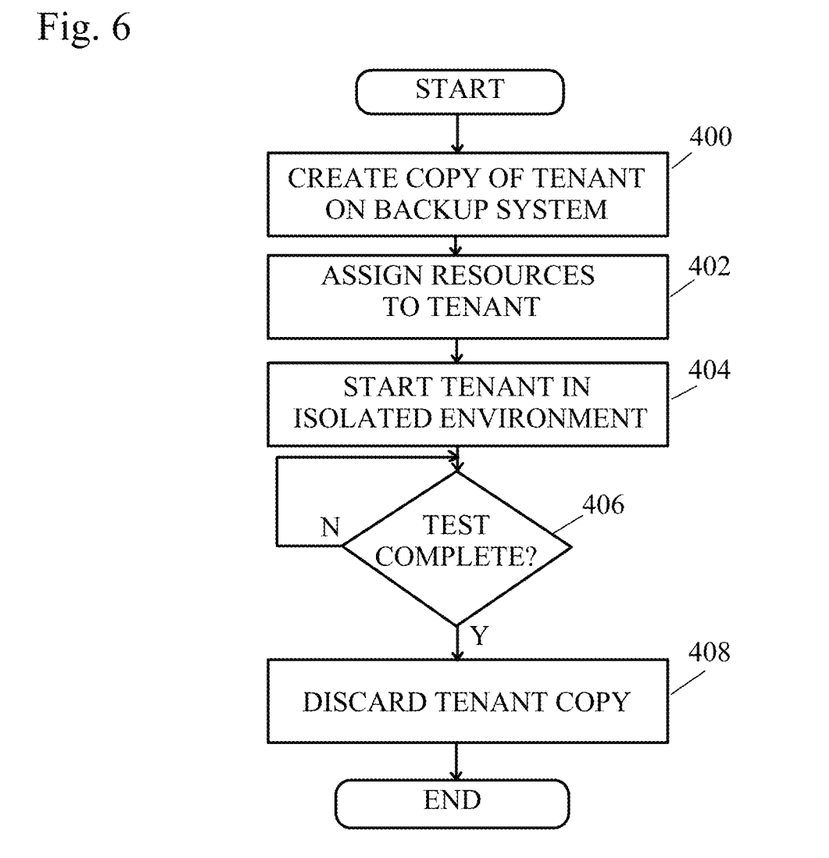
FIG. 6 shows a flowchart of a method of Disaster Recovery in a Practice DR scenario.

As diagrammed in FIG. 4A, the procedure shown in the flowchart of FIG. 6 comprises the following steps:

Creating a consistent copy of the replicated tenant on the backup system while replication continues (Step 400).

Assigning compute resources to the tenant (Step 402). It should be noted that this could be done ahead of time.

Starting the tenant in an isolated environment—for example, in a cloud group specified by the system administrator (Step 404). The workload environment will startup first and can then be logged into. Inside the workload environment the tenant administrator can then start up workloads in the desired order either manually or via automated startup script.

Once testing is complete (Step 406), the system can discard the tenant copy on the backup. (Step 408)

Disaster Recovery—DR (Unplanned Failover)

Figure 7:
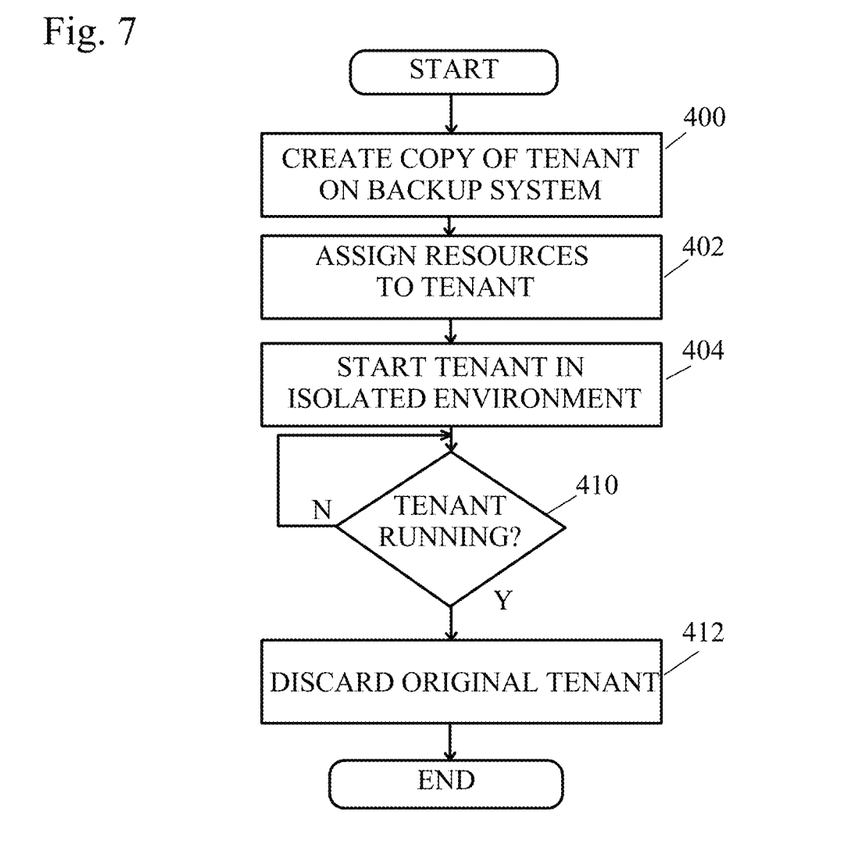
FIG. 7 shows a flowchart of a method of Disaster Recovery in a DR Unplanned Failover scenario.

As diagrammed in FIG. 4B, the procedure shown in the flowchart of FIG. 7 comprises the following steps, in which steps 400-404 are the same as in the previous scenario of FIG. 6, above:

Creating a consistent copy of the replicated tenant on the backup system while replication continues (Step 400).

Assigning computer resources to the tenant (Step 402).

Starting the tenant in an isolated environment—for example, in a cloud group specified by the system administrator (Step 404). The workload environment will startup first and can then be logged into. Inside the workload environment the tenant administrator can then start up workloads in the desired order either manually or via automated startup script. In a first alternative, the system can break storage replication of the tenant on the backup system and start the tenant without making a copy—this approach does not require extra storage since there is no copy. In a second alternative, Once the primary system is restored, the system can replicate the tenant back to the original primary system and discard the original primary tenant as it is no longer current, then perform a planned failover (see the method of FIG. 8, below) during a maintenance window.

Once the tenant copy is running (Step 410), discarding the original tenant on the primary and backup systems (Step 412).

Disaster Recovery (DR)—Planned failover

Figure 8:
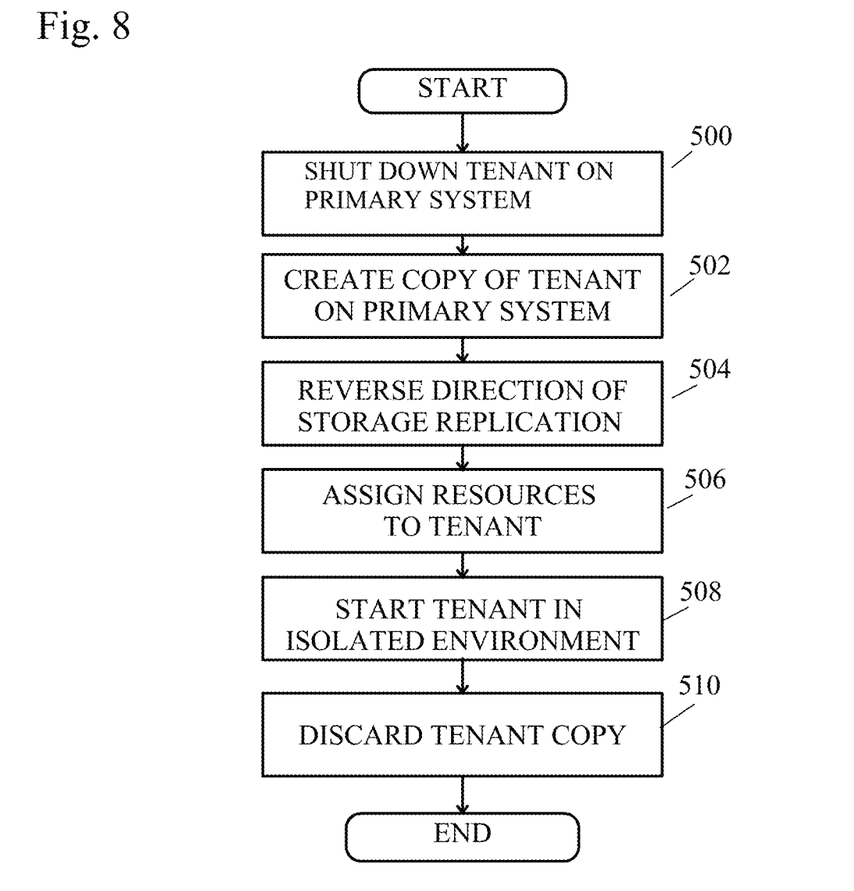
FIG. 8 shows a flowchart of a method of Disaster Recovery in a DR Planned Failover scenario.

As diagrammed in FIG. 4C, the procedure shown in the flowchart of FIG. 8 comprises the following steps:

Shutting down the tenant on the primary system during a maintenance window. (Step 500)

Optionally, a copy of the tenant on the primary system is created as a backup. (Step 502). It should be noted that performing this optional step requires extra storage capacity on the primary system.

Reversing direction of storage replication of the tenant (i.e. from backup to primary) (Step 504).

Assigning compute resources to tenant on the backup system (optionally done ahead of time) (Step 506).

Starting the tenant on the backup system in an isolated environment, for example in a cloud group specified by the system administrator (Step 508). The workload environment will startup first and can then be logged into. Inside the workload environment the tenant administrator can then start up workloads in the desired order either manually or via automated startup script.

Optionally, the tenant copy on the original primary system is discarded. (Step 510)

Disaster Recovery Considerations

Extra storage: Creating a copy of a tenant requires available storage capacity. For a fully loaded system this may mean adding internal storage expansions to be able to both hold continuously replicating tenants and be able to startup a copies of tenant environment for practice DR. To practice DR for a fully loaded primary system, the backup system can optionally reserve twice the storage capacity of the primary. The full tenant storage quota is reserved on the primary and backup system to allow the system to protect against overcommitment of storage.

External resources: The applications being replicated may be connected to resources outside of the workload environment, such as databases, external storage (SAN), or network attached storage (NAS). In this case, the failover and practice failover of the workload environment must be coordinated with all external resources.

Applying maintenance to the primary and backup systems: The System Administrator may optionally create copies of tenant environments to hold as a backup during maintenance. The System Administrator will apply maintenance to primary system, then backup system.

Same workload IPs and hostnames on both systems: With the use of disk replication for the entire tenant, deployed workloads that are brought up on the backup system will have the same IPs and hostnames as the primary system Some embodiments of the present invention may include one, or more, of the following operations, features, characteristics and/or advantages: (i) receiving storage volume information including information indicative of an identity of a set of storage volumes being used by a set of applications; (ii) newly creating a new storage volume to be included in the set of storage volumes; (iii) configuring the new storage volume for replication from a primary location to a secondary location; (iv) responsive to the configuration of the new storage volume, conducting a practice event including: (a) snapshotting the new storage volume, and (b) starting the applications (cpu, memory and networking); (v) providing a preview of the practice event, with the preview showing the amount of resources the practice snapshot will take after the snapshot (storage) and after starting the applications (cpu, memory and networking); (vi) receiving, from a user and through a user interface, designation data indicative of a designation of compute/virtualization hypervisor hosts resources ahead of time for use during a disaster or a practice event; (vii) responsive to conduction of the practice event, initiating a consistent-synchronized copy of all of the storage volumes in use by the application or applications; (viii) replication of platform as a service (PaaS) in a practice mode by conducting a practice event including: (a) snapshotting the relevant data sets, and (b) starting the applications (CPU, memory and networking); ix) integrating the PaaS to integrate into a practice event by providing additional intelligence, such as properly coordinating an ordered startup of applications together with all of their dependent applications; (x) simultaneously replicating multiple tenants associated with the PaaS, instead of replicating a single workload environment; (xi) leverages an already existing ability to (a) replicate storage, and (b) perform an immediate logical copy of that storage ("FlashCopy"); (xi) automatically creates a second copy of the replicated data; (xii) creates a copy in the absence of and prior to a disaster, rather than during or after a disaster; (xii) creates a copy within one of the storage systems, rather than to a separate storage system; (xiii) immediately triggers deployments to this copy, causing it to drift from the original data and lose its character as a copy; (xiv) at least some embodiments are directed to hardware-based rather than software-based storage replication (it is noted that hardware replication is typically more efficient than software replication; (xv) coordinating a failover by managing an integrated hardware-based replication environment; and/or (xvi) leverages an ability to copy virtual disks rather than file systems.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
receiving storage volume information including information indicative of an identity of a set of storage volume(s) being used by a set of application(s) in an application infrastructure corresponding to at least one of multiple tenants of a platform as a service (Paas);
newly creating a new storage volume to be included in the set of storage volume(s);
configuring the new storage volume for replication from a primary location to a secondary location;
replicating the new storage volume from the primary location to the secondary location; and
responsive to the replication of the new storage volume to the secondary location:
mapping the replicated copy of the new storage volume to the application infrastructure at the secondary location, such that at least one virtualization hypervisor host is attached to the replicated copy of the new storage volume;
registering all applications to the application infrastructure at the secondary location; and
conducting a practice event at the secondary location including: snapshotting the replicated copy of the new storage volume, and starting the applications by executing at least a computer processing unit, memory and networking of the applications and simultaneously replicating the multiple tenants associated with the PaaS instead of replicating a single work environment at the secondary location.

2. The method of claim 1, further comprising: providing a preview of the practice event, with the preview showing the amount of resources the practice snapshot will take after the snapshot and after starting the applications.

3. The method of claim 1, further comprising: receiving, from a user and through a user interface, designation data indicative of a designation of virtualization hypervisor hosts resources ahead of time for use during a disaster or a practice event.

4. The method of claim 1, further comprising: responsive to conduction of the practice event, initiating a consistent synchronized copy of all of the storage volumes in use by the application or applications.

5. A computer program product comprising a computer comprising at least one processor, one or more memories, one or more computer readable storage media, the computer program product comprising a computer readable storage medium having program instructions embodied therewith, the program instructions executable by the computer to perform a method comprising:
receiving, by the computer, storage volume information including information indicative of an identity of a set of storage volume(s) being used by a set of application(s) in an application infrastructure corresponding to at least one of multiple tenants of a platform as a service (PaaS);
newly creating, by the computer, a new storage volume to be included in the set of storage volume(s);
configuring, by the computer, the new storage volume for replication from a primary location to a secondary location;
replicating, by the computer, the new storage volume from a primary location to the secondary location; and
responsive to the replication configuration of the new storage volume to the secondary location:
mapping the replicated copy of the new storage volume to the application infrastructure at the secondary location, such that at least one virtualization hypervisor host is attached to the replicated copy of the new storage volume;
registering all applications to the application infrastructure at the secondary location; and
conducting, by the computer, a practice event including: snapshotting the replicated copy of the new storage volume, and starting the applications by executing at least a computer processing unit, memory, and networking associated with the applications and simultaneously replicating the multiple tenants associated with the PaaS instead of replicating a single work environment at the secondary location.

6. The computer program product of claim 5, further comprising: providing, by the computer, a preview of the practice event, with the preview showing the amount of resources the practice snapshot will take after the snapshot and after starting the applications.

7. The computer program product of claim 5, further comprising: receiving, from a user and through a user interface, designation data indicative of a designation of virtualization hypervisor hosts resources ahead of time for use during a disaster or a practice event.

8. The computer program product of claim 5, further comprising: responsive to conduction of the practice event, initiating, by the computer, a consistent synchronized copy of all of the storage volumes in use by the application or applications.

* * * * *